United States Patent
Peters et al.

(10) Patent No.: US 10,213,872 B2
(45) Date of Patent: Feb. 26, 2019

(54) MACHINING HEAD AND MACHINING DEVICE

(71) Applicant: OERLIKON METCO AG, WOHLEN, Wohlen (CH)

(72) Inventors: Thomas Peters, Lenzburg (CH); Tobias Leuppi, Dottikon (CH); Andreas Gisler, Riet bei Neftenbach (CH)

(73) Assignee: OERLIKON METCO AG, WOHLEN, Wohlen (CH)

( * ) Notice: Subject to any disclaimer, the term of this patent is extended or adjusted under 35 U.S.C. 154(b) by 277 days.

(21) Appl. No.: 15/123,146

(22) PCT Filed: Mar. 2, 2015

(86) PCT No.: PCT/EP2015/054238
§ 371 (c)(1),
(2) Date: Sep. 1, 2016

(87) PCT Pub. No.: WO2015/132171
PCT Pub. Date: Sep. 11, 2015

(65) Prior Publication Data
US 2017/0072510 A1  Mar. 16, 2017

(30) Foreign Application Priority Data
Mar. 4, 2014 (EP) .................... 14157566

(51) Int. Cl.
*B23K 26/14* (2014.01)
*B23K 37/00* (2006.01)
*B23K 26/144* (2014.01)

(52) U.S. Cl.
CPC ........ *B23K 26/1462* (2015.10); *B23K 26/144* (2015.10); *B23K 37/003* (2013.01)

(58) Field of Classification Search
CPC ........................................... B23K 26/14
(Continued)

(56) References Cited

U.S. PATENT DOCUMENTS 4,400,180 A * 8/1983 Marion .................... C01B 3/32
                                                       252/373
5,321,228 A   6/1994 Krause et al.
(Continued)

FOREIGN PATENT DOCUMENTS

| CN | 1142794 | 2/1997 |
| CN | 1255411 | 6/2000 |

(Continued)

OTHER PUBLICATIONS

China Search Report/Office Action conducted in China Appln. No. 201580020384.6 (dated Oct. 25, 2017).
(Continued)

*Primary Examiner* — Samuel M Heinrich
(74) *Attorney, Agent, or Firm* — Greenblum & Bernstein, P.L.C.

(57) ABSTRACT

A processing head (1) for surface processing by means of a laser beam is disclosed. The processing head (1) comprises a through passage (2) for a laser having a longitudinal axis (A), at least one powder supply passage (3) and a cooling passage (4) for cooling the processing head (1). The processing head (1) is at least configured of two parts and comprises a body (5) and a sleeve (6). The sleeve (6) is suitable for the arrangement at the body (5). The through passage (2) of the laser and the powder feed channel (3) are configured in the body (5). The body (5) at least partly forms a first sidewall of the cooling passage (4). The sleeve (6) at least partly forms a second sidewall of the cooling passage (4).

19 Claims, 2 Drawing Sheets

Figure 1:
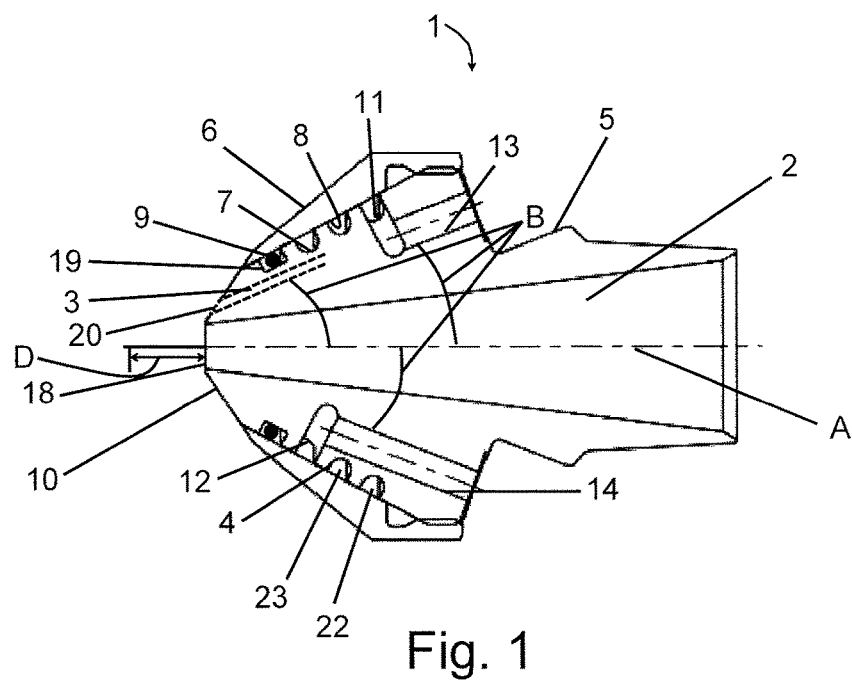

(58) Field of Classification Search
USPC .............. 219/121.6, 121.63–121.66, 121.84, 219/121.85
See application file for complete search history.

(56) References Cited

U.S. PATENT DOCUMENTS

| | | | |
|---|---|---|---|
| 5,477,026 A | 12/1995 | Buongiorno | |
| 7,259,353 B2 | 8/2007 | Guo | |
| 2005/0056628 A1* | 3/2005 | Hu | B23K 26/144 219/121.84 |
| 2006/0127521 A1* | 6/2006 | Toshio | B29C 45/231 425/146 |
| 2008/0179300 A1 | 7/2008 | Stiles et al. | |
| 2012/0152927 A1 | 6/2012 | Hung | |

FOREIGN PATENT DOCUMENTS

| | | |
|---|---|---|
| CN | 102828178 | 12/2012 |
| DE | 3940766 | 6/1991 |
| DE | 100 35 622 | 2/2002 |
| JP | 2-6185 | 1/1990 |
| JP | 10-501463 | 2/1998 |
| JP | 2007-111773 | 5/2007 |
| RU | 2043789 | 9/1995 |
| RU | 2080190 | 5/1997 |
| RU | 2317183 | 2/2008 |
| RU | 2397329 | 8/2010 |
| RU | 2409708 | 1/2011 |
| WO | 93/00171 | 1/1993 |
| WO | 95/20458 | 8/1995 |

OTHER PUBLICATIONS

Second China Search Report/Office Action conducted in China Appln. No. 201580020384.6 (dated Sep. 11, 2018) (w/ English language translation).
Japan Notif. Of Reasons for Refusal conducted in Japan Appln. No. 2016-555525 (dated Sep. 25, 2018) (w/ English translation).
Austrialian Office Action conducted in counterpart Australian Appln. No. 2015226286 (dated Nov. 12, 2018).
Russia Office Action conducted in counterpart Russia Appln. No. 2016137479 (dated Oct. 6, 2018).

* cited by examiner

MACHINING HEAD AND MACHINING DEVICE

The invention relates to a processing head for surface processing by means of a laser beam and to a processing unit comprising the processing head in accordance with the preamble of the independent claims.

From the state of the art it is known to apply powder at a component by means of a laser deposition process. For this purpose, the powder is conveyed to the component, amongst other things, by means of a processing head, wherein the powder is conveyed to a melt spot which was previously molten by means of the laser. Typically the laser beam is guided through a through passage for a laser of the processing head and is focused at a spacing of 10 mm to 20 mm from an outlet side of the processing head. Moreover, the powder is conveyed through the processing head via at least one powder supply passage. In this connection, the processing head can have one or more powder supply passages whose outlet openings are arranged at the outlet side of the processing head, frequently around the outlet opening of the laser beam; alternatively the powder supply passage can be configured as a ring gap which is arranged around the through passage for a laser.

During the carrying out of the laser deposition welding process a strong heating of the processing head can, in some circumstances, be brought about, as approximately ⅓ to ⅔ of the supplied laser power are reflected which is then substantially incident at the processing head. The reflected portion is in this connection substantially dependent on the wavelength of the laser that is used. For example, one assumes for Nd:YAG lasers, fiber lasers, disc lasers or diode lasers, that typically approximately ⅓ of the power is reflected and for $CO_2$ lasers that up to ⅔ of the power are reflected.

From the U.S. Pat. No. 7,259,353 an apparatus for cooling the processing head on laser deposition welding is known. In this example it is suggested to arrange a cooling jacket having an as large as possible volume around the processing head in order to enable an as efficient as possible cooling.

The known state of the art, however, has the disadvantage that the cooling power is not always sufficient. Moreover, the large volume cooling jacket significantly increases the size of the processing head which can be disadvantageous during operation. Furthermore, the known processing heads can be too expensive, in some circumstances due to a manufacturing method demanding in effort and cost or also due to too high a demand in material; this is moreover disadvantageous, as the processing heads have to be exchanged relatively frequently. A further disadvantage is the insufficient cooling of the tip of the processing head facing the component to be processed in some circumstances.

WO 95/20458 A1 discloses a processing head for surface processing by means of a laser beam comprising a body and a sleeve for arrangement on the body. Body and sleeve together form a cooling passage of the processing head. The processing head also shows a plurality of other assembly parts.

For this reason it is in particular an object of the present invention to avoid the disadvantages of the known, in particular to thus make available a processing head which can be produced in a simple and cost-effective manner which has a compact manner of construction and which ensures a high cooling power during operation.

This object is satisfied by the processing head and the processing unit in accordance with the independent claims.

The dependent claims relate to preferred embodiments of the present invention.

The invention relates to a processing head for surface processing by means of a laser beam. The processing head comprises a through passage for a laser having a longitudinal axis, at least one powder supply passage and a cooling passage for cooling the processing head. The processing head is configured of at least two parts and comprises a body and a sleeve. The sleeve is suitable for the arrangement at the body. The through passage of the laser and the powder supply passage are configured in the body. The body at least partly forms a first sidewall of the cooling passage. The sleeve at least partly forms a second sidewall of the cooling passage.

This has the advantage that the recesses required for the formation of the cooling passage can be applied prior to the arrangement of the sleeve at the body which makes the manufacture more simple and cost-effective. Furthermore, it is possible by arrangement of the through passage of the laser and the powder supply passage in the body that only a few assembly parts are required for the processing head. Moreover, the cooling passage can be arranged without problems in such a way that a sufficient cooling of the processing head and in particular of the tip of the processing head can be ensured, as, for example, a heat exchanger configured as a labyrinth can be produced by means of the simple formation of the cooling passage during the manufacturing process. The recesses can in this connection be applied in the body and/or in the sleeve, wherein the cooling passage is formed by the sleeve after the arrangement of the sleeve at the body. During operation a cooling medium, such as, for example, water, can in this respect be conveyed through the cooling passage for the dissipation of heat.

The cooling passage can in this connection be formed in a material cutting method, such as for example a milling method. Alternatively, the body and/or the sleeve having the cooling passage can be formed in a formative method, such as, for example a die casting process.

The body and the sleeve in particular in a section of at least 50%, preferably of at least 75% and particularly preferably of at least 90% of the overall length of the cooling passage form the first sidewall and the second sidewall in the processing head.

The processing head has in particular only a single through passage for the laser. However, it is also possible that it comprises a plurality of through passages for the laser.

Said body of the processing head can be designed in particular in one-piece and can be manufactured in particular from a homogeneous raw part, for example from a block of copper or copper alloy.

Frequently, the processing head is also referred to as a powder flow nozzle. The body is frequently referred to as a hub body or a nozzle body.

Preferably, the body and the sleeve can be connected to one another in a releasable manner. In particular the body and the sleeve are screwed to one another.

This has the advantage that, if required, one of the two components can be exchanged. As the sleeve represents the outer component which is subjected to increased thermal loads during operation, this is possibly exchanged more frequently. As the sleeve is frequently the more cost effective part the costs are further reduced during operation. Moreover, the sleeve can simply be removed by means of the releasable connection for a cleaning of the cooling passage in a simple manner.

Preferably the body and the sleeve are fixedly connected. In particular, the body and the sleeve are brazed to one another.

This has the advantage that a compact manner of construction of the processing head can be achieved as, for example, the arrangement of a thread can be omitted.

Preferably, the body has a first feed passage and a second feed passage for supply and discharge of a cooling medium to and from the cooling passage.

This has the advantage that no additional components are necessary for forming the supply and discharge of the cooling medium to the cooling passage. This allows a particularly simple and therefore cost-effective construction of the processing head.

Preferably, the processing head consists of the body, the sleeve and optional seals, especially only a seal, for example in the form of an O-ring. In particular, small parts can be arranged at the processing head, which are not allocated to the processing head in this regard.

This has the advantage that the processing head consists of only very few components and is thus particularly simple and inexpensive.

Preferably, the cooling passage is configured as a cooling coil or as a cooling spiral. This has the advantage of being able to achieve a high cooling power for an ideal consumption of cooling medium. Moreover, having regard to cooling coils or cooling spirals, which configure the regions guiding the cooling mediums, can be configured substantially without sharp corners, sharp edges, as well as projecting or returning steps, such that a corresponding pressure loss can be avoided. Hereby the cooling power is further increased.

Preferably, the cooling passage is arranged in the body or in the sleeve. In other words, the cooling passage is merely arranged in the body or in the sleeve; if the cooling passage is only arranged in the body, then the sleeve only forms the second sidewall; if the cooling passage is only arranged in the sleeve, then the body only forms the first sidewall.

The arrangement of the cooling passage only in the body has the advantage that the sleeve can be configured with a smaller wall thickness in order to achieve a more compact manner of construction.

The arrangement of the cooling passage only in the sleeve has the advantage that the cooling can be configured more efficient, as the cooling passage is arranged close to the warm outer side of the processing head.

The cooling passage is preferably arranged in the body and in the sleeve. This has the advantage that the cooling passage can be configured with a large flow cross-section for a further increase of the cooling power.

Preferably a seal is arranged in a region facing an outlet side of the laser beam for sealing the cooling passage. The seal is in particular configured as a sealing ring which can preferably be introduced into a groove of the body.

This has the advantage that a good seal between the body and the sleeve can be ensured, such that the cooling medium cannot emerge during operation and arrive at the component to be processed.

Naturally, a further seal can be arranged at the side disposed remote from the outlet side of the laser beam between the sleeve and the body, preferably in analogy to the above seal. This has the advantage that a cooling medium cannot emerge during operation and arrive at the component to be processed.

Preferably, the body and the sleeve are configured at least in a section thereof tapering towards the outlet side. The body and the sleeve are in particular configured at least in a section thereof conically tapering towards the outlet side. In other words, the processing head is configured, in particular conically, tapering towards the outlet side in at least a section thereof.

The sleeve and the body can, for example, be configured in such a way that a section of the sleeve and of the body remote from the outlet side are configured cylindrically; a section of the sleeve and of the body facing the outlet side can be configured conically tapering. A thread can be arranged in the cylindrical section for the releasable fastening of the sleeve to the body. The body and the sleeve are in this connection configured with shapes matched with respect to one another such that the sleeve can be fastened to the body in accordance with the invention.

The formation of the processing head having an in particular conically tapering section has the advantage that the processing head has a smaller cross-section towards the component and can thus be handled in a more simple manner.

Preferably, the cooling passage is at least partly and preferably completely arranged in the tapering section. This has the advantage that the section facing the outlet side which is heated most strongly during operation is cooled most efficiently.

Preferably, at least one section of the cooling passage is arranged in parallel to a plane perpendicular to the longitudinal axis A. This has the advantage that a section of the cooling passage is guided around the body substantially at an axial position, whereby a long cooling passage having an efficient cooling can be realized.

Preferably, at least a first section and a second section of the cooling passage are arranged spaced apart from one another in parallel to the longitudinal axis A. This has the advantage that an efficient cooling of the processing head can be achieved in parallel to the longitudinal axis, as the cooling passage is arranged along the processing head.

Preferably, the cooling passage has a first feed opening and a second feed opening for the supply and/or removal of a cooling medium. The first feed opening and the second feed opening are arranged spaced apart from one another in parallel to the longitudinal axis A. For example, a cooling medium can be conveyed into the cooling passage through the first feed opening and can be conveyed away from the cooling passage through the second feed opening. Naturally, the conveyance of the cooling medium can also take place in the reverse direction.

This has the advantage that the cooling medium is used only once for the cooling of the processing head before it is conveyed out of the processing head. Naturally, also a closed loop operation for the cooling medium is possible, in which the cooling medium is actively and/or passively cooled after the conveyance out of the cooling passage and is subsequently again conveyed into the cooling passage which advantageously brings about a reduction of the consumption of cooling medium.

In some circumstances it is advantageous to resupply the cooling medium into the feed opening, which is arranged closer to the outlet side, as the outlet side is frequently the warmest. As the cooling medium is heated during the conveyance through the cooling passage, a more efficient cooling is thus possible at the beginning of the conveyance of the cooling medium through the cooling passage which is advantageous for the cooling of the hot region facing the outlet side.

Preferably, the first feed opening is in flow communication with the first feed passage and the second feed opening is in flow communication with the second feed passage. The first feed passage and/or the second feed passage are arranged, at least in a section, substantially at a like angle of inclination with respect to the longitudinal axis as the powder feed passage is arranged.

This has the advantage that the processing head can be of compact design.

Preferably, the cooling passage is arranged at a side of the through passage for a laser remote from the longitudinal axis A and in particular is arranged at a side of the through passage for a laser remote from the at least one powder supply passage. In other words, the cooling passage is arranged outwardly in the processing head and is provided around the through passage for a laser and in particular around the at least one powder feed passage.

This has the advantage that a cooling of the outer regions of the processing head which are frequently subjected to the highest thermal loads can be ensured.

Preferably the sleeve and in particular the body are made of a material substantially having a thermal conductivity of larger than 300 W/(m×K). Preferably, the material has a thermal conductivity of larger than 340 W/(m×K) and particularly preferably of larger than 380 W/(m×K). For example, the material can be copper or also a copper alloy.

This has the advantage that, in addition to the cooling by means of the cooling medium, the heat can be dissipated well by means of the material selection, for example, by conducting the heat to the cooling medium.

A further aspect of the present invention relates to a processing unit for the surface processing by means of a laser beam. The processing unit comprises a processing head as described above.

Figures 2, 3:
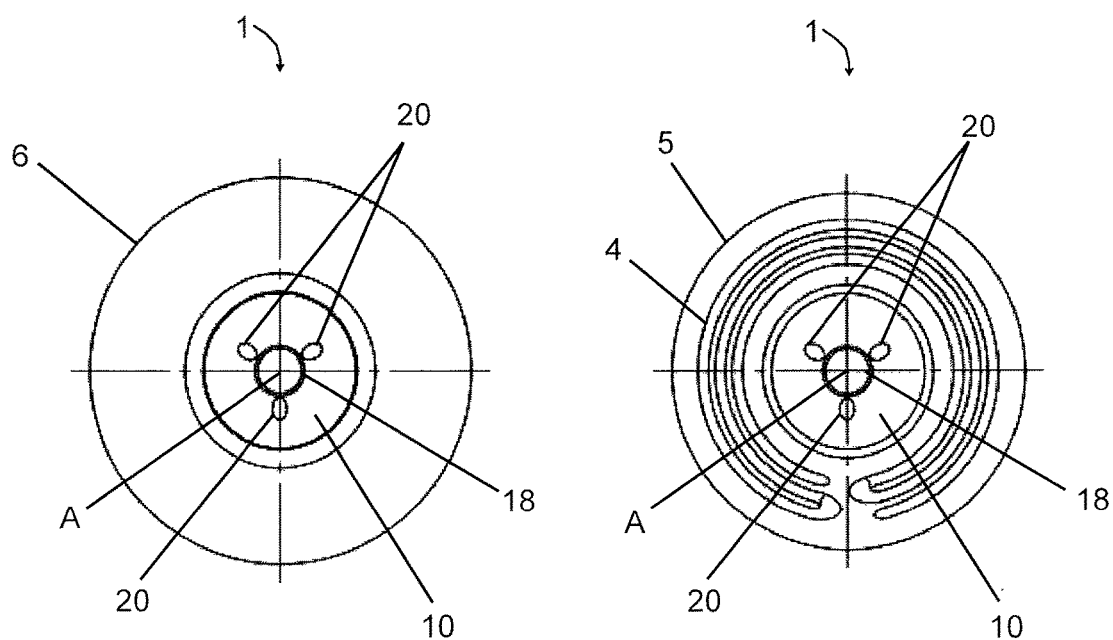
Figure 4:
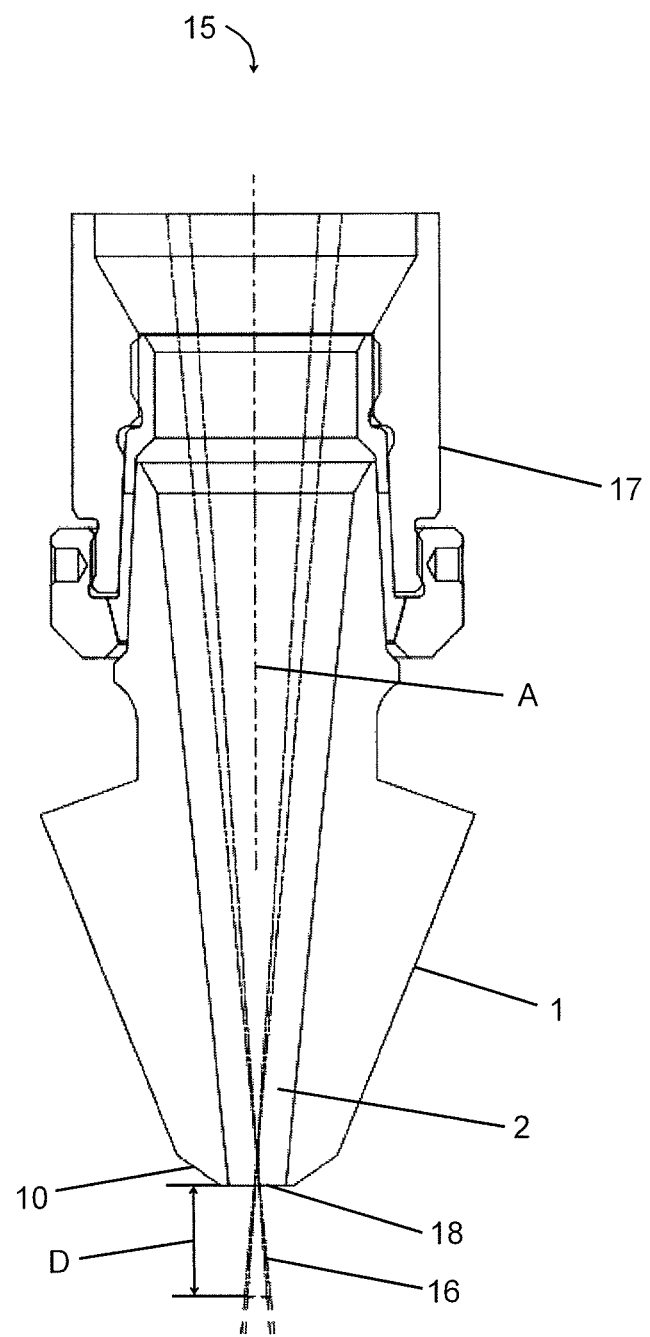

Further features and advantages of the invention are explained in the following in detail by means of embodiments for a better understanding without the invention having to be limited to the embodiments. There is shown:

FIG. 1 a schematic illustration of a processing head in accordance with the invention in a side view;

FIG. 2 a front view of the processing head in accordance with FIG. 1 with a sleeve;

FIG. 3 a front view of the processing head in accordance with FIG. 2 without a sleeve; and FIG. 4 a schematic illustration of a section of a processing unit having a processing head in accordance with FIG. 1.

In a schematic illustration a processing head 1 in accordance with the invention is illustrated in a side view in FIG. 1. The processing head 1 is configured of two parts and comprises a body 5 as well as a sleeve fastened to the body 5 in a releasable manner. Naturally the sleeve 6 can also be fixedly connected to the body 5, for example by means of brazing.

The processing head 1 has an outlet side 10 in which one outlet opening 18 for a laser beam is arranged. Moreover, an outlet opening 20 of a powder passage 3 is arranged at the outlet side 10 for the conveyance of powder to a component to be processed; the outlet opening and the powder passage 3 are illustrated with dotted lines only for the purpose of illustration, as the powder passage lies in a different sectional plane than, for example, a first feed passage 13 with respect to a rotation about the longitudinal axis A.

The processing head 1 is configured conically tapering in a section with respect to the outer side 10.

At a side remote from the outlet side 10, the body 5 has a thread not illustrated in this instance by means of which the sleeve 6 can be screwed to the body 5; for this purpose the sleeve 6 has a complementary internal thread not illustrated in this instance.

In the conically tapering section of the body a cooling passage 4 configured as a cooling coil is arranged; this cooling passage 4 can, for example, be milled into the body 5 by means of a miller. As an alternative to the formation as a cooling coil the cooling passage 4 can naturally also be configured as a cooling spiral.

A first section 22 of the cooling passage 4 is arranged in parallel to a plane perpendicular with respect to the longitudinal axis A. Moreover, the first section 22 and a second section 23 of the cooling passage 4 are arranged spaced apart from one another in parallel with the longitudinal axis.

The cooling passage 4 has a first feed opening 11 and a second feed opening 12 for the supply and/or removal of a cooling medium.

The body 5 has a groove 19 for the reception of a sealing ring for the formation of a seal 9. For the formation of a further seal, a further groove can be provided for the reception of a further sealing ring if required in the region of the thread arranged at the side remote from the outlet side 10.

The processing head 1 has a through passage 2 for a laser having the longitudinal axis A. During operation the laser is guided in the through passage 2 for a laser at the side remote from the outlet side 10, whereupon the laser beam propagates along the longitudinal axis A and exits the processing head 1 through the outlet opening 18.

The cooling passage 4 has a first sidewall 7 which is formed by the body 5. A second sidewall 8 is formed by the sleeve 6. The cooling medium can thus be conveyed along the cooling passage 4 substantially in parallel to the sidewalls 7 and 8.

The body 5 has the first feed opening 11 and the second feed opening 12 for the supply and/or removal of the cooling medium. The first feed opening 11 is in flow communication with a first feed passage 13. The second feed opening 12 is in flow communication with a second feed passage 14. The cooling medium can be conveyed to the cooling passage 4 by means of the feed passages.

The first feed opening 11 and the second feed opening 12 are arranged spaced apart from one another in parallel to the longitudinal axis A.

The cooling passage 4 is arranged at a side of the through passage 2 for a laser and of the powder supply passage 3 remote from the longitudinal axis A.

The powder supply passage 3 having the outlet opening 20 (illustrated in a dotted manner) is inclined with respect to the longitudinal axis A such that the powder beam cuts the longitudinal axis A at a spacing D of approximately 12 mm from the outlet opening 18. The laser not illustrated in this instance is now focused in such a way that the melt spots can be produced at a component by means of the laser at the spacing D.

The powder supply passage 3, the first feed passage 13 and the second feed passage 14 are arranged in a section substantially at an equal angle of inclination B with respect to the longitudinal axis A.

A front view of the processing head 1 in accordance with FIG. 1 is illustrated in the FIGS. 2 and 3. FIG. 2 shows the processing head 1 with the sleeve 6. FIG. 3 shows the processing head 1 without the sleeve which is why the cooling passage 4 is visible.

The same reference numerals relate to like features in all Figures and are only explained again if required.

In a schematic illustration a section of a processing unit 15 having a processing head 1 in accordance with FIG. 1 is shown in FIG. 4.

The processing unit 15 comprises a receiver sleeve 17 for the processing head 1. The laser beam 16 is guided through the receiver sleeve and subsequently through the processing head 1.

The laser beam 16 exits through the outlet opening 18 from the processing unit 15 and in this connection is focused in such a way that the melt point can be produced at a component, not illustrated in this instance, at a spacing D to which melt spot the powder is then conveyed as described above.

During operation the processing unit 15 is guided over the component by means of a positioning unit not shown in this instance, whereby a so-called weld bead is formed.

The invention claimed is:

1. A processing head for laser beam surface processing, comprising:
    a body having a longitudinal axis;
    a sleeve positionable on the body;
    a laser beam through passage located in the body;
    at least one powder feed channel located in the body; and
    a cooling passage defining a meandering cooling path around at least part of the through passage for cooling the processing head,
    wherein the body is structured to at least partly form a first side wall of the cooling passage and the sleeve is structured to at least partly form a second sidewall of the cooling passage.

2. A processing head in accordance with claim 1, wherein a first feed passage and a second feed passage are arranged in the body for the supply and discharge of a cooling medium to and from the cooling passage.

3. A processing head in accordance with claim 1, further comprising at least one sealing element, wherein the processing head consists of the body, the sleeve and the at least one sealing element.

4. A processing head in accordance with claim 1, wherein the cooling passage is configured as a cooling coil or as a cooling spiral.

5. A processing head in accordance with claim 1, wherein the cooling passage is arranged in at least one of the body and the sleeve.

6. A processing head in accordance with claim 1, further comprising a sealing element arranged in a region facing an outlet side of the laser beam in order to seal the cooling passage.

7. A processing head in accordance with claim 1, wherein the body and the sleeve are configured to taper toward an outlet side of the laser beam, at least in a section.

8. A processing head in accordance with claim 7, wherein the cooling passage is arranged at least partly in the tapering section.

9. A processing head in accordance with claim 2, wherein the cooling passage has a first feed opening and a second feed opening structured for the supply and/or removal of a cooling medium, and wherein the first feed opening and the second feed opening are axially spaced apart from one another relative to the longitudinal axis.

10. A processing head in accordance with claim 9, wherein the first feed opening is in flow communication with the first feed passage and the second feed opening is in flow communication with the second feed passage, and wherein the first feed passage and/or the second feed passage, at least in a section, and the powder supply passage are arranged at substantially a same angle of inclination with respect to the longitudinal axis.

11. A processing head in accordance with claim 1, wherein the cooling passage is arranged at least one of in or along a surface of the body remote from the through passage.

12. A processing head in accordance with claim 1, wherein at least one of the sleeve and in particular the body are produced substantially from a material having a thermal conductivity larger than 300 W/(m×K).

13. A processing unit for laser beam surface processing, comprising:
    a processing head in accordance with claim 1.

14. A processing head in accordance with claim 6, wherein the sealing element comprises a sealing ring.

15. A processing head in accordance with claim 7, wherein the taper toward the outlet side is a conical taper.

16. A processing head in accordance with claim 8, wherein the cooling passage is arranged completely in the tapering section.

17. A processing head in accordance with claim 11, wherein the at least one powder supply passage is arranged between the cooling passage and the through passage.

18. A processing head in accordance with claim 12, wherein the thermal conductivity is larger than 340 W/(m×K).

19. A processing head in accordance with claim 12, wherein the thermal conductivity is larger than 380 W/(m×K).

* * * * *